Jan. 20, 1970  J. M. ROETHLISBERGER  3,490,251
POT TYPE UNIVERSAL JOINT
Filed Sept. 18, 1968  2 Sheets-Sheet 1
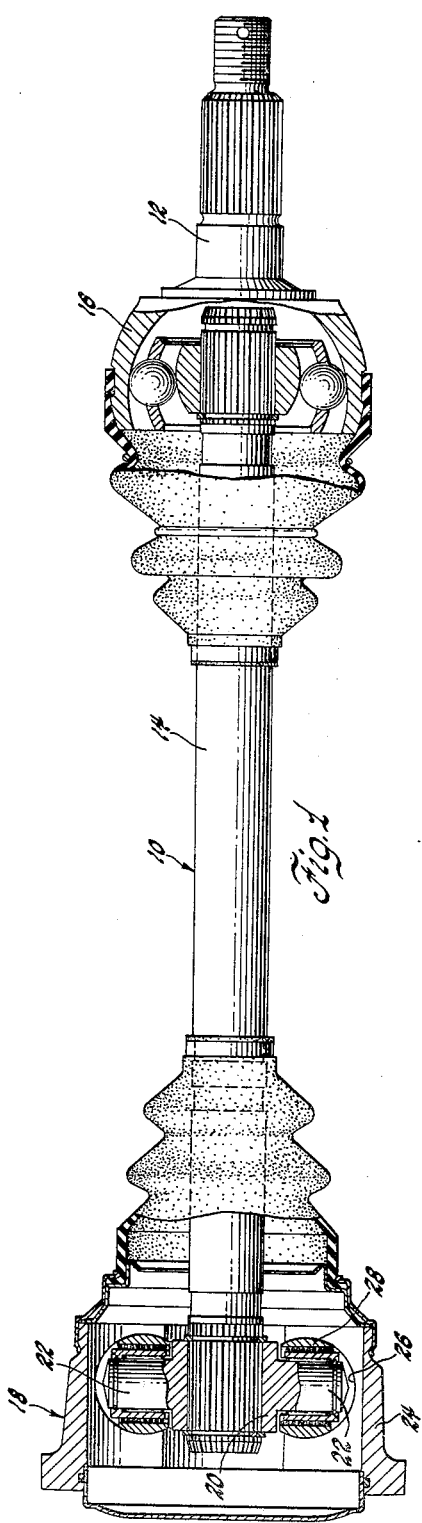
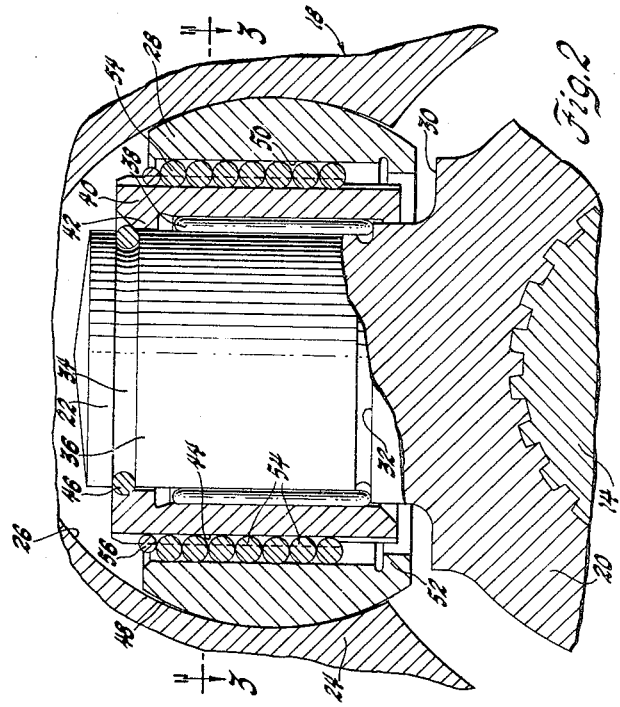
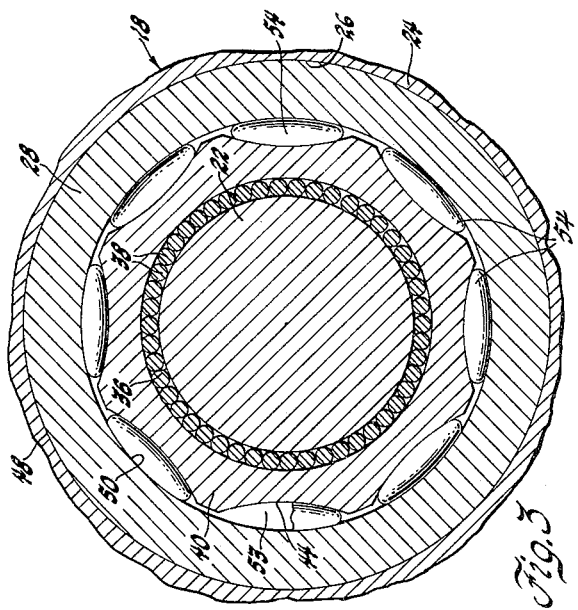
INVENTOR.
Jerry M. Roethlisberger
BY
Herbert Furman
ATTORNEY Jan. 20, 1970  J. M. ROETHLISBERGER  3,490,251
POT TYPE UNIVERSAL JOINT
Filed Sept. 18, 1968  2 Sheets-Sheet 2

INVENTOR.
Jerry M. Roethlisberger
BY
Herbert Furman
ATTORNEY

United States Patent Office

3,490,251
Patented Jan. 20, 1970

3,490,251
POT TYPE UNIVERSAL JOINT
Jerry M. Roethlisberger, Bridgeport, Mich., assignor to General Motors Corporation, Detroit, Mich., a corporation of Delaware
Filed Sept. 18, 1968, Ser. No. 760,553
Int. Cl. F16d 3/18
U.S. Cl. 64—8                                    8 Claims

ABSTRACT OF THE DISCLOSURE

A tri-pot universal joint has a race member telescoped over each trunnion and a ball member telescoped over each race member. In one embodiment, roller bearings mount the race member to the trunnion for rotation about the trunnion axis and barrel bearings mount the ball member to the race member for reciprocation relative to the trunnion axis. In another embodiment, ball bearings are substituted for the barrel bearings. In a third embodiment, the trunnion has a square cross section and the race member has a corresponding square bore. Roller bearings mount the race member to the trunnion for reciprocation and roller bearings mount the ball member to the race member for rotation about the trunnion axis.

---

This invention relates to pot-type universal joints and more particularly to the mounting of the ball members upon the trunnions for both reciprocation and rotation about the trunnion axis.

Conventionally, the ball members of a pot-type universal joint are mounted by roller bearings on the trunnions for rotational movement. When the joint is angulated, the ball members tend to move in an arcuate path about the instantaneous center of angulation. However, since the ball members are constrained by pot grooves to run in a linear path, the ball members must reciprocate relative to the trunnion when the joint is angulated. This reciprocation occurs between the ball member and the trunnion resulting in longitudinal friction on the surfaces of the roller bearings. The friction wears flat spots on the roller bearings, reducing their effectiveness and their life, and thereby reducing the life of the universal joint.

Various attempts have been made to reduce the friction on the roller bearings as the ball members reciprocate relative to the trunnions. However, most of these have been unsuccessful in that they often require a loss of other features, such as self-alignment, of pot-type universal joints in order to accomplish the reduction in the sliding friction.

It is, therefore, the primary object of this invention to provide a pot-type universal joint wherein the ball members freely rotate and reciprocate relative to their respective trunnions without any appreciable frictional wear between the ball members and their anti-friction supports on the trunnion. Another object of this invention is to provide a pot-type universal joint wherein the ball members are supported on the trunnions by race members located between the ball members and the trunnions and supported on the trunnions by anti-friction elements which permit one mode of movement relative to the trunnion axis, with the ball members being supported on the race members by anti-friction elements which permit an opposite mode of movement of the ball members relative to the race members. A still further object of this invention is to provide a pot-type universal joint which virtually eliminates any sliding friction on roller bearings used to mount the ball members to the trunnion members.

These and other objects of the invention will become apparent from the following detailed description taken in conjunction with the accompanying drawings in which:

FIGURE 1 is a partially broken away view showing a drive shaft assembly for a front-wheel drive automobile embodying a universal joint according to this invention;

FIGURE 2 is an enlarged sectional view of a portion of the universal joint shown in FIGURE 1;

FIGURE 3 is a sectional view taken generally along the line 3—3 of FIGURE 2;

Figure 5:
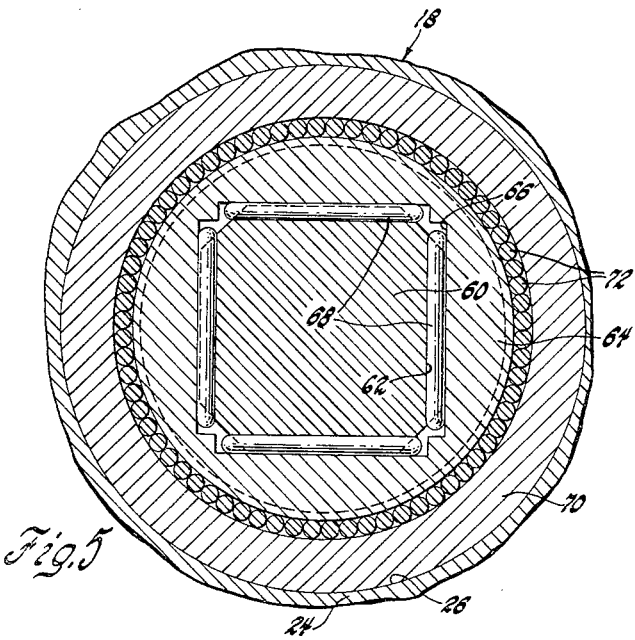
FIGURE 5 is a sectional view taken generally along the line 5—5 of FIGURE 4.

Referring now to FIGURE 1, a drive shaft assembly 10 for a front-wheel drive automobile includes a conventional wheel spindle 12 and a conventional drive shaft 14 drivingly connected together by a conventional Rzeppa joint 16. A tri-pot universal joint 18 connects the drive shaft 14 to the output shaft of a conventional transmission (not shown). The joint 18 has an inner spider 20 conventionally secured to shaft 14. The inner spider includes three trunnions 22. The outer pot 24 of joint 18 includes three cylindrical cross-sectional grooves 26 each of which receives a hollow ball member 28 mounted on a respective trunnion 22 according to this invention to drivingly interconnect the spider 20 and the pot 24 of joint 18.

Inasmuch as each trunnion-ball member assembly of the tri-pot universal joint is the same, only one will be described in detail.

In the preferred embodiment, shown in FIGURES 1, 2 and 3, the trunnion 22 includes an annular shoulder 30, an annular roller bearing retaining flange 32 adjacent to the inner end thereof and a snap ring groove 34 adjacent to the outer end thereof. Running about the surface 36 of trunnion 22 are a multiplicity of roller bearings 38. Telescoped over trunnion 22 is an annular race member 40 having a radially, inwardly extending annular bearing retaining flange 42 at the outer end of the bore to retain roller bearings 38 in position and having a series of circumferentially spaced arcuate axial grooves 44 in its outer surface. The race member 40 is held in position on the trunnion by a snap ring 46 which fits into snap ring groove 34 on trunnion 22.

Ball member 28 has a spherical outer surface 48 which mates with a cylindrical groove 26 in outer pot 24, and is telescoped over a race member 40. The ball member has an inner cylindrical bore 50 and a radially, inwardly extending retaining flange 52. When the ball member 28 is telescoped over race member 40, the axial grooves 44 and the bore 50 define a series of spaced-longitudinal passages 53 into each of which are inserted a multiplicity of barrel bearings 54. The barrel bearings 54 are retained by flange 52 and by snap ring 56 around race member 40. The barrel bearings 54 enable the ball member 28 to reciprocate axially with respect to the race member 40 upon angulation of the trunnion 22 without any appreciable longitudinal friction on the roller bearings 38. The roller bearings 38 enable the race member 40 and the ball member 28 to rotate about the axis of the trunnion 22 as the trunnion moves back and forth in its cylindrical groove 26 upon angulation of the joint. Thus, in a pot-type universal joint built according to this invention, the ball member 28 can both rotate and reciprocate relative to the axis of the trunnion 22 without any appreciable longitudinal friction on the roller bearings 38.

Figure 4:
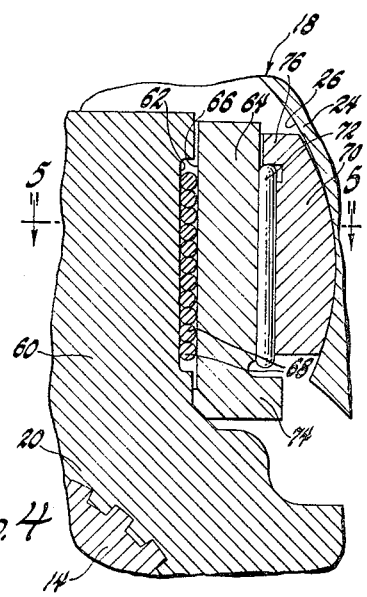
FIGURE 4 is a view similar to FIGURE 2 showing a second embodiment.

Another embodiment of this invention is shown in FIGURES 4 and 5. In this embodiment each trunnion 60 is of square cross section and has a flat surface 62 recessed in each flat side.

The race member 64 is similar to race member 40 except that it has a bore 66 of generally square cross section. When the race member 64 is telescoped over the trunnion 60, the recessed, flat surfaces 62 form cavities. Into these cavities are inserted a multiciplity of roller bearings 68 to mount the race member 64 to the trunnion member 60. In assembly, the roller bearings 68 can be placed in the recessed flat surfaces 62 and held there while race member 64 is telescoped over the trunnion 60. A ball member 70 is telescoped over the race member 64. A number of roller bearings 72 are inserted and retained in position between the race member 64 and the ball member 70 by a radially outwardly extending annular flange 74 on the race member 64 and a radially inwardly extending annular flange 76 on the ball member 70. The ball member 70 rotates about the race member 64 on roller bearings 72 and the ball member 70 and the race member 64 reciprocate relative to the trunnion 60 on roller bearings 68. Thus, the second embodiment of the invention allows a reciprocating and a rotary motion of the ball member 70 about the trunnion axis without substantial longitudinal friction on the roller bearings 68 and 72.

Figure 7:
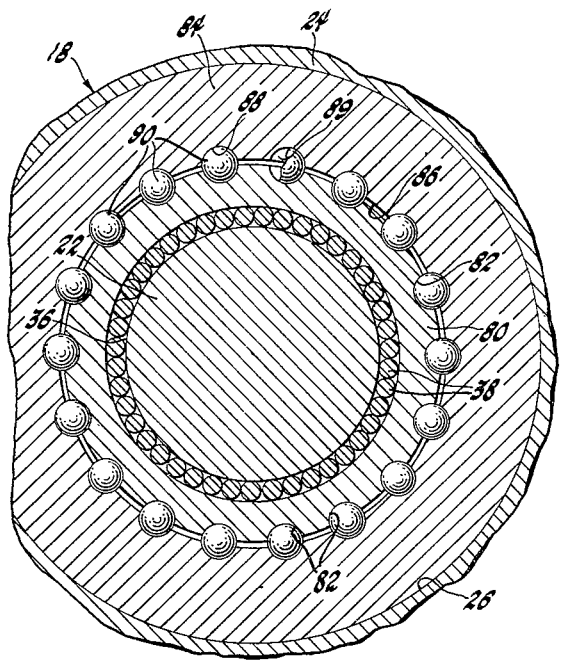
FIGURE 7 is a sectional view taken generally along the line 7—7 of FIGURE 6.
Figure 6:
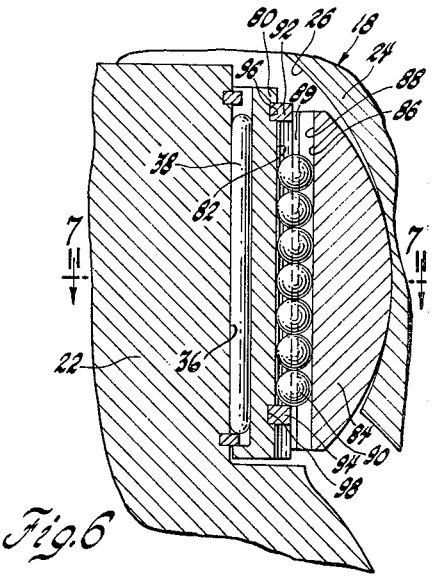
FIGURE 6 is a view similar to FIGURE 2 showing a third embodiment.

A third embodiment of this invention is shown in FIGURES 6 and 7. In this embodiment, race member 80 is telescoped around trunnion 22 on roller bearings 38, as in FIGURES 2 and 3. However, race member 80 differs from race member 40 in that it has a number of circumferentially-spaced, semi-circular axial grooves 82 in its outer surface. Ball member 84 is similar to ball member 28 except that its bore 86 has a like number of circumferentially-spaced, radially inwardly facing axial grooves 88. When ball member 84 is telescoped over race member 80, the semi-circular grooves 82 and 88 define cylindrical passages 89 into each of which a multiplicity of ball bearings 90 are inserted. The ball bearings 90 are retained in the cylindrical passages 89 by snap rings 92 and 94 inserted in grooves 96 and 98 at the ends of race member 80.

In this embodiment, the ball member 84 reciprocates on ball bearings 90 relative to the axis of the trunnion 22 and both the ball member 84 and the race member 80 rotate on roller bearings 38 about the axis of trunnion 22. Thus, upon angulation of the universal joint, the ball member 84 can both reciprocate and rotate about the trunnion axis without appreciable longitudinal friction on the roller bearings 38.

Although the three embodiments of this invention differ as to their structural details, they all operate in a manner which substantially eliminates any longitudinal friction on the roller bearings.

What is claimed is:

1. In a universal joint having driving and driven elements, a plurality of trunnions on one element, a ball member having a bore for telescopically receiving each trunnion, and mating grooves for each ball member in the other element, the improvement comprising, means mounting the ball member to each trunnion for rotation and reciprocation of the ball member relative to the trunnion axis, including, an annular race member telescoped between each ball member and its respective trunnion, a plurality of first anti-friction elements mounting the race member to the trunnion for one mode of movement, and a plurality of second anti-friction elements mounting the ball member to the race member for movement therewith and for an opposite mode of movement independently thereof.

2. A universal joint as recited in claim 1 wherein the first anti-friction elements mount the race member to the trunnion for rotation and the second anti-friction elements mount the ball member to the race member for reciprocation.

3. A universal joint as recited in claim 1 wherein the first anti-friction elements mount the race member to the trunnion for reciprocation and the second anti-friction elements mount the ball member to the race member for rotation.

4. In a universal joint having driving and driven elements, a plurality of trunnions on one element, a ball member having a bore for telescopically receiving each trunnion and mating grooves for each ball member in the other element the improvement comprising, an annular race member telescoped between each ball member and its respective trunnion, a plurality of first anti-friction elements mounting the race member to the trunnion for rotation about the trunnion axis, and a plurality of second anti-friction elements mounting the ball member to the race member for rotation therewith and reciprocation independently thereof relative to the trunnion axis.

5. In a universal joint having driving and driven elements, a plurality of trunnions on one element, a ball member having a bore fortelescopically receiving each trunnion and mating grooves for each ball member in the other element the improvement comprising, an annular race member telescoped between each ball member and its respective trunnion, a plurality of first anti-friction elements mounting the race member to the trunnion for reciprocation, and a plurality of second anti-friction elements mounting the ball member to the race member for reciprocation therewith and rotation independently thereof relative to the trunnion axis.

6. A universal joint as recited in claim 4 wherein the race member includes a plurality of arcuate cross-section axial grooves in one surface, the second anti-friction elements are barrel bearings fitting into the grooves in the race member and contacting the bore surface of the race member, and the first anti-friction elements are roller bearings between the race member and the trunnion.

7. A universal joint as recited in claim 4 wherein the race member has axial grooves in one surface and the ball member has respective axial grooves in its bore surface, both of semi-circular cross-section, the second anti-friction elements are ball bearings which fit into the grooves in the ball member and the race member and the first anti-friction elements are roller bearings between the race member and the trunnion.

8. A universal joint as recited in claim 5 wherein the trunnion is of polygonal cross section and the race member has a similar polygonal shaped bore, the first anti-friction elements are roller bearings which engage the flat surfaces of the race member and of the trunnion, and the second anti-friction elements are roller bearings between the ball member and the race member.

References Cited

UNITED STATES PATENTS

| 580,498 | 4/1897 | Lewis | 308—176 |
| 1,018,697 | 2/1912 | Davis | 308—176 |
| 3,318,108 | 5/1967 | Cadiou | 64—8 |

FOREIGN PATENTS 925,100  3/1947  France.

HALL C. COE, Primary Examiner

U.S. Cl. X.R.

308—176, 196